US007810865B2

(12) United States Patent

Costigan

(10) Patent No.: US 7,810,865 B2
(45) Date of Patent: Oct. 12, 2010

(54) ROD PASS THROUGH FOR VEHICLE DOOR

(75) Inventor: Terrence P. Costigan, Fenton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 710 days.

(21) Appl. No.: 11/745,476

(22) Filed: May 8, 2007

(65) Prior Publication Data

US 2008/0277965 A1 Nov. 13, 2008

(51) Int. Cl.
*B60J 10/08* (2006.01)

(52) U.S. Cl. .................................................. 296/146.9

(58) Field of Classification Search .............. 296/146.2, 296/146.5, 146.9; 49/502, 475.1
See application file for complete search history.

(56) References Cited

U.S. PATENT DOCUMENTS 5,555,677 A * 9/1996 DeRees et al. ................ 49/502
5,946,858 A * 9/1999 Staser .......................... 49/352
6,197,403 B1 * 3/2001 Brown et al. ................ 428/137
6,676,195 B1 * 1/2004 Marriott et al. .......... 296/146.7
6,767,049 B1 * 7/2004 Morrison et al. ......... 296/146.7
2008/0276538 A1 * 11/2008 Costigan ....................... 49/375
2008/0289259 A1 * 11/2008 Costigan et al. ............... 49/502

FOREIGN PATENT DOCUMENTS

WO 2006/074632 A1 7/2006

* cited by examiner

*Primary Examiner*—H. Gutman

(57) ABSTRACT

A locking rod flange and a vertical locking rod for a vehicle door, and method of assembling a vehicle door. The locking rod flange may be integral with a glass run channel or an integrated channel and regulator, and may include a locking rod carrier with a rod pass through hole through which the vertical locking rod extends. A rod pass through seal may be mounted on the locking rod carrier, and the locking rod carrier may include a bridge portion over which a water deflector seal is applied.

12 Claims, 3 Drawing Sheets

ROD PASS THROUGH FOR VEHICLE DOOR

BACKGROUND OF THE INVENTION

The present application relates generally to a door for an automotive vehicle.

For passenger comfort, it is desirable to reduce the wind noise within an automotive vehicle. Thus, engineers attempt to seal holes in the automobile body. This includes sealing holes in the vehicle doors.

For example, it is desirable to seal around a vertical locking rod in the side doors. But employing such a seal makes the door assembly process more difficult since the inside vertical locking rod typically must be assembled to the door latch before latch installation due to poor access to the latch after it is installed. Thus, unless a more costly cable is used instead of a rod, the vertical locking rod must be either connected to the latch and then routed through a sealing grommet hole in a sheet metal door inner panel, or routed through the sealing grommet hole in the door inner panel and then connected to the door latch. Both operations are difficult because the assembly plant operator must handle both the rod and the latch inside the door cavity by reaching in through an access hole in the door inner panel. The difficulty of the installation can be further aggravated if some window regulator components are integrated with a rear glass run channel.

In addition, it is desirable to route the vertical locking rod so that it does not interfere with a water deflector—or a seal for the water deflector—that covers the access hole after assembly. And this needs to be accomplished without interfering with the movable window, its guides, and the widow regulator assembly that moves the window between its various positions.

SUMMARY OF THE INVENTION

An embodiment contemplates an integrated channel/regulator for a vehicle door with a movable window glass. The integrated channel/regulator may comprise a glass run channel mounted in the vehicle door and shaped to slidably receive the window glass; a locking rod flange, extending from the integrated channel/regulator, including a locking rod carrier spaced from the glass run channel, with the locking rod carrier including a rod pass through hole; and a vertical locking rod extending through the pass through hole and adapted to operatively engage a door latch assembly.

An embodiment contemplates a vehicle door, having a movable window glass. The vehicle door may comprise a door inner panel including a lower door portion defining an access hole therethrough; a glass run channel mounted to door inner panel and shaped to slidably receive the window glass; a locking rod flange, extending from the glass run channel, including a locking rod carrier spaced from the glass run channel, with the locking rod carrier including a rod pass through hole at least partially aligned with the access hole; and a vertical locking rod extending through the pass through hole and extending from the vehicle door.

An embodiment contemplates a method of assembling a vehicle door comprising the steps of: mounting a door latch assembly onto a rear glass run channel; assembling a vertical locking rod to the door latch assembly extending through a rod pass through hole on a locking rod flange extending from the rear glass run channel to form a latch/window regulator module; inserting the latch/window regulator module through an access hole in a door inner panel of the vehicle door; and securing the latch/window regulator module to the door inner panel.

An advantage of an embodiment is that the locking rod flange extending from the rear glass run channel allows a locking rod carrier to support the rod pass through seal. Moreover, the vertical locking rod does not have to be routed through a sealing grommet hole in the door inner panel during assembly, but still has a seal through which the rod extends in order to minimize wind noise entering the vehicle.

An advantage of an embodiment is that the extension of the locking rod carrier to form a bridge portion for a water deflector seal allows the access hole in the door inner panel to be larger, while still providing for a continuous water deflector seal—all without interfering with the vertical locking rod.

An advantage of an embodiment is that a sub-assembly of the vertical locking rod and rod pass through seal can be pre-assembled before assembling them to the door inner panel. This makes the door assembly process easier on an assembly line.

DETAILED DESCRIPTION

Figure 1:
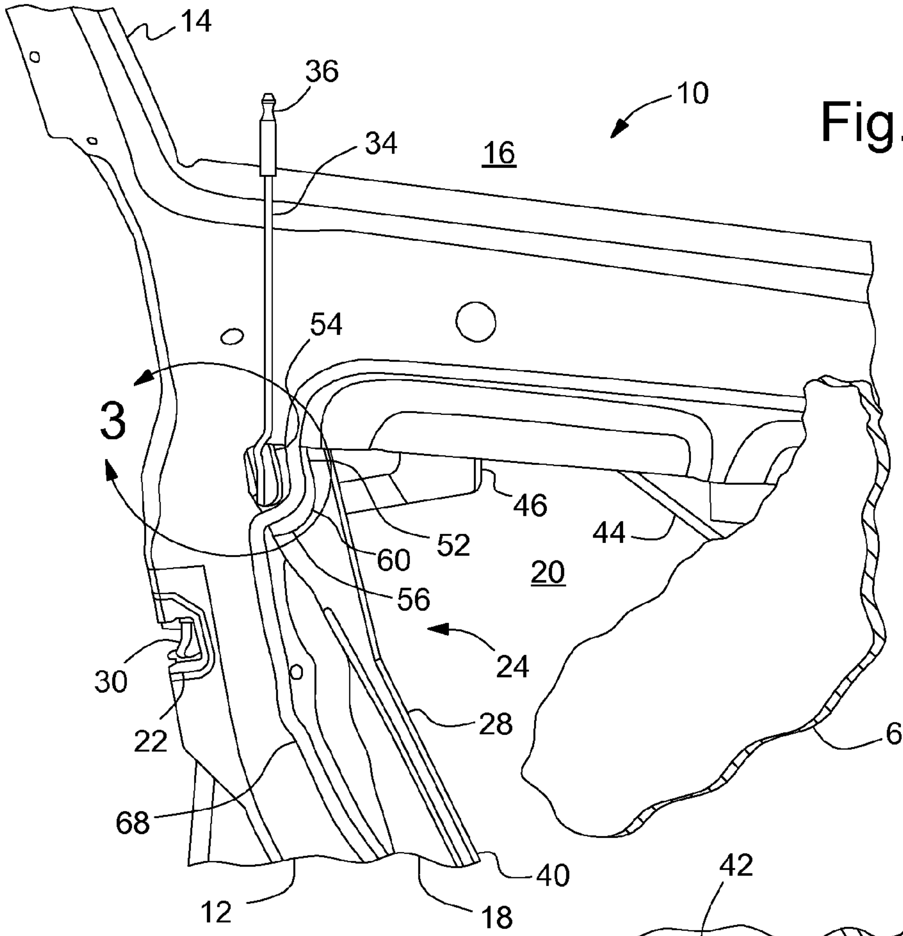
FIG. 1 is a perspective view of an interior portion of a door inner panel and other interior components of a vehicle door.
Figure 2:
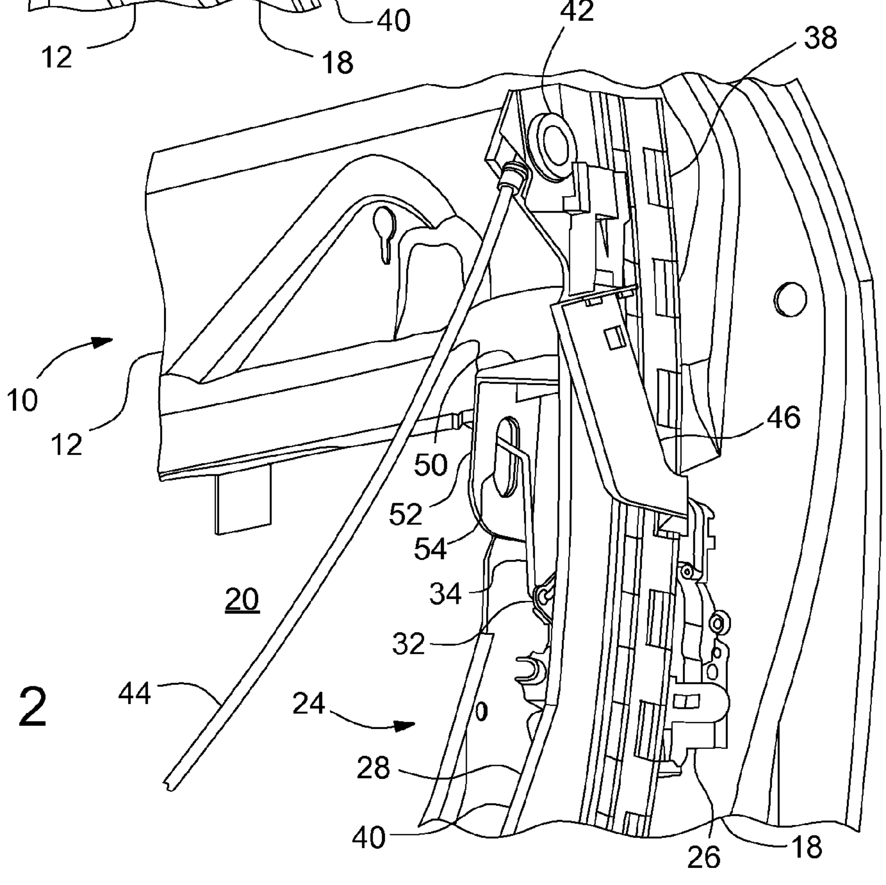
FIG. 2 is a perspective view of an exterior portion of the door inner panel and other interior components of the vehicle door.
Figure 3:
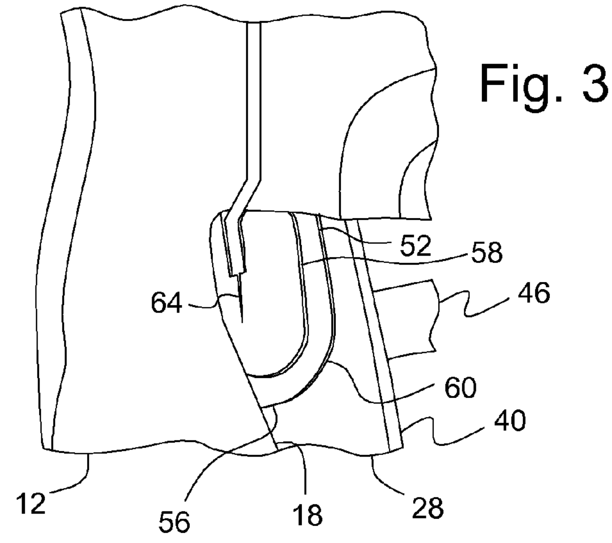
FIG. 3 is a view, on an enlarged scale, taken from encircled area 3 on FIG. 1, and showing a rod pass through seal but not showing a water deflector seal.
Figure 4:
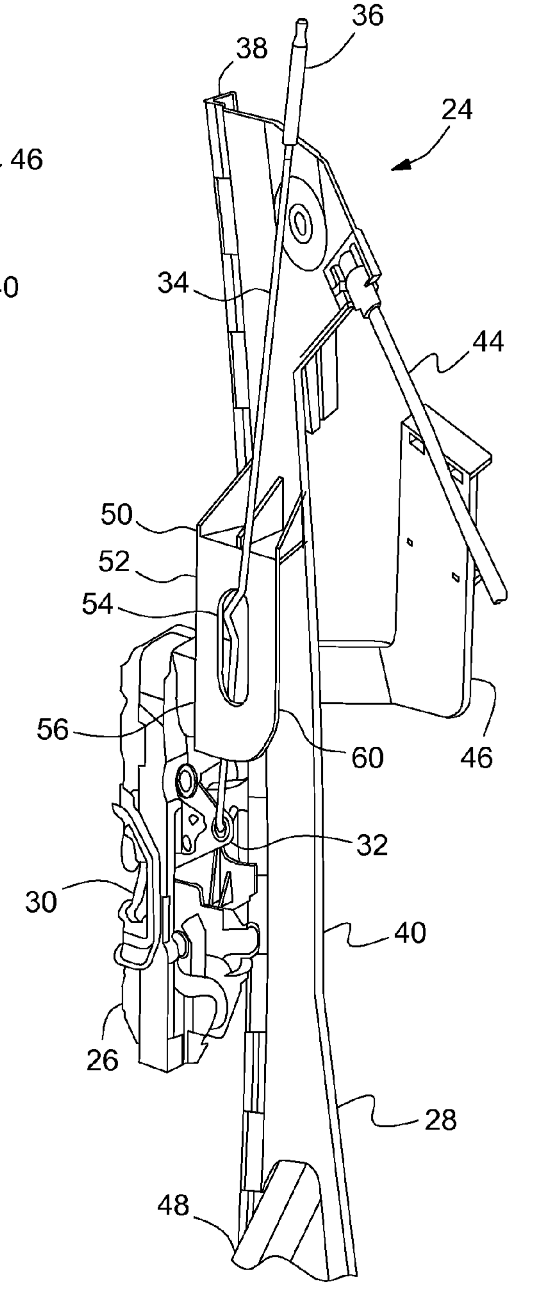
FIG. 4 is a perspective view of a portion of a rear latch/window regulator module.
Figure 5:
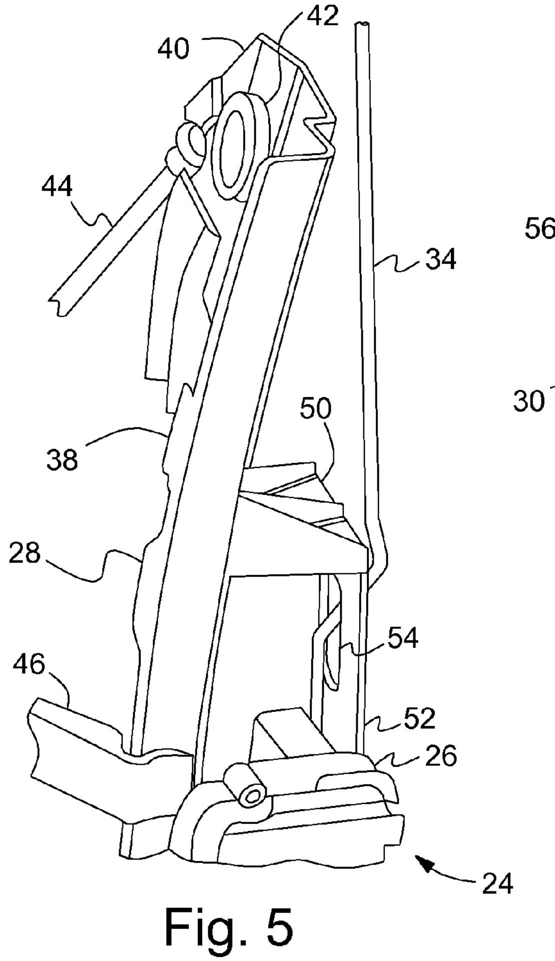
FIG. 5 is a perspective view of a portion of the rear latch/window regulator module.
Figure 6:
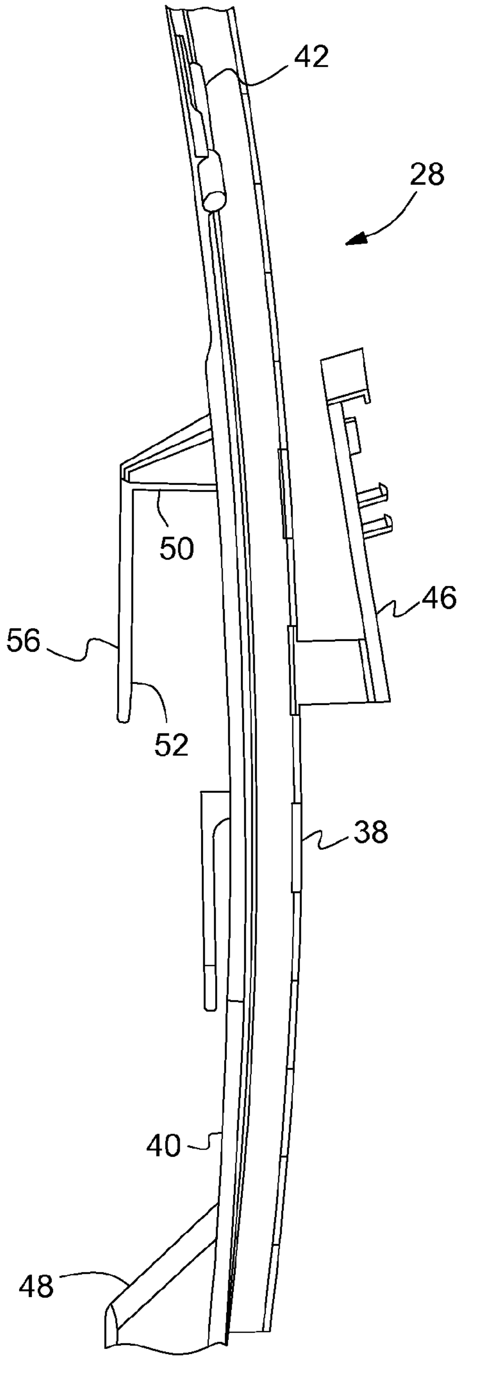
FIG. 6 is an elevation view of a portion of a rear integrated channel/regulator.
Figure 7:
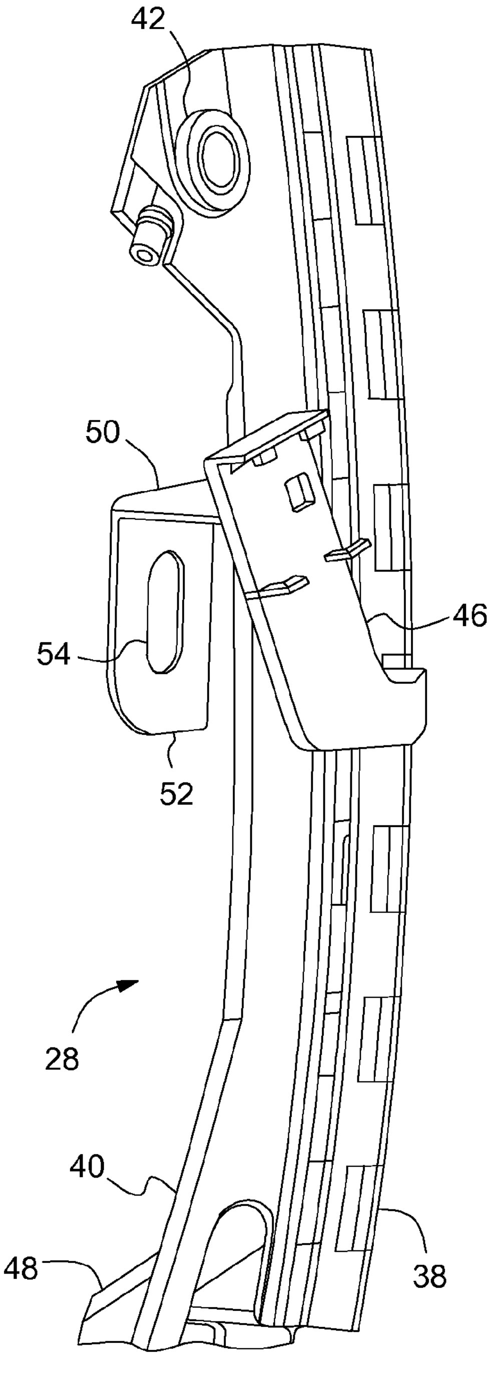
FIG. 7 is a perspective view, on an enlarged scale, of a portion of the rear integrated channel/regulator of FIG. 6.

FIGS. 1-7 illustrate portions of a vehicle door 10, having a door inner panel 12. The door inner panel 12 includes structure forming a window frame 14 that defines a window opening 16, and other structure forming a lower door portion 18 that defines an access hole 20 and a door latch opening 22. The access hole 20 allows various components and sub-assemblies, such as a latch/window regulator module 24, to be assembled into the door 10.

The latch/window regulator module 24 is mounted to the door inner panel 12, and includes a door latch assembly 26 mounted to a rear integrated channel/regulator 28. The door latch assembly 26 includes a latching portion 30 that aligns with the door latch opening 22 and a locking rod latch lever 32 to which a vertical locking rod 34 is connected. The vertical locking rod 34 is mounted so that a finger pull 36 is located close to the window opening 16 and will be accessible by a vehicle occupant after the vehicle door 10 is completely assembled.

The rear integrated channel/regulator 28 has various portions that, while being mostly formed from an integral piece, perform different functions within the door 10. Preferably, the integrated channel/regulator 28 is a molded plastic part, allowing the various portions to be formed integrally. The term integral, as used herein, means that the particular elements are formed as a single monolithic piece rather than being formed separately and later assembled and secured together.

The rear integrated channel/regulator 28 may include a rear below belt glass run channel 38 that is integral with and extends from a window regulator guide rail 40. A top rear pulley 42 and bottom rear pulley (not shown) may mount to the guide rail 40 and guide a cable (not shown)—part of a window regulator cable assembly 44—that controls the vertical movement of a window glass (not shown). An integral outside door handle support flange 46 may extend from the glass run channel 38. Also, an integral rear/lower door mounting boss 48 may extend from the guide rail 40 and provide a location for securing the integrated channel/regulator 28 to the door inner panel 12.

Most significantly, a locking rod flange 50 may be integral with and extend from rear integrated channel/regulator 28. The locking rod flange 50 includes a portion that forms a locking rod carrier 52. The locking rod carrier 52 includes a rod pass through hole 54, and an inner surface 56 that serves as both a mounting location for a rod pass through seal 58 (only shown in FIG. 3) and a bridge portion 60, discussed below. When the integrated channel regulator 28 is mounted to the door inner panel 12, the locking rod carrier aligns with the access hole 20 so that the bridge portion 60 and at least a portion of the rod pass through hole 54 are exposed in the access hole 20.

The rod pass through seal 58 mounts to the inner surface 56, covering the rod pass through hole 54. A rod slit 64 in the seal 58 allows the vertical locking rod 34 to pass through the seal 58. The seal 58 may be made of, for example, foam or EPDM (ethylene propylene dien monomer), and helps to seal against wind noise entering the vehicle.

The rear integrated channel/regulator 28, by including an integral locking rod flange 50 and mount for the door latch assembly 26, allows for pre-assembly of the door latch assembly 26, vertical locking rod 34 and pass through seal 58 to the channel/regulator 28 before they are mounted to the door inner panel 12. The door latch assembly 26 can be mounted to the rear integrated channel/regulator 28. The vertical locking rod 34 is slid through the slit 64 in the pass through seal 58 and attached to the locking rod latch lever 32. The window regulator cable assembly 44 and other window regulator components (not shown), as well as any seals (not shown) or other components for the glass channel, may also be pre-assembled to the channel/regulator 28. These pre-assembled components, then, may be inserted through the access hole 20 and secured to the door inner panel 12. One will note that this assembly process provides for much easier assembly of the components than prior door assemblies where a vertical locking rod passes through a grommet hole in the sheet metal of the door inner panel during assembly—requiring more assembly steps to take place within the tight confines of the door 10.

Also mounted to the door inner panel 12 is a water deflector 66 that covers the access hole 20. A water deflector seal 68 (shown only in FIG. 1), preferably an adhesive, is applied to the door inner panel 12 and extends around most of the periphery of the access hole 20 in order to seal and secure the water deflector 66 to the door inner panel 12. In order to provide the sealing function while not interfering with the vertical locking rod 34, the water deflector 66 is notched out around the location where the vertical locking rod 34 passes through the access hole 20. Furthermore, in order to assure a continuous seal, the water deflector seal 68 extends over the bridge portion 60 on the inner surface 56 of the locking rod carrier 52 and may also extend over a portion of the pass through seal 58. Thus, the locking rod flange 50 performs two functions, both providing a rod carrier 52 and seal 58 for the vertical locking rod 34, and providing a bridge portion 60 to allow for a continuous seal 68 for the water deflector 66.

The particular embodiment discussed in detail herein refers to a rear integrated channel/regulator 28. However, as an alternative, the rear glass run channel for guiding the window and the rear window regulator guide rail may be separate components (a more conventional arrangement not shown herein), with the locking rod flange 50 extending from the rear glass run channel similar to the way it is shown extending from the integrated channel/regulator 28. Thus, when referring to a rear integrated channel/regulator herein, this may also include a rear glass run channel used in a vehicle door.

While certain embodiments of the present invention have been described in detail, those familiar with the art to which this invention relates will recognize various alternative designs and embodiments for practicing the invention as defined by the following claims.

What is claimed is:

1. An integrated channel and regulator for a vehicle door with a movable window glass, the integrated channel and regulator comprising:

a glass run channel mounted in the vehicle door and shaped to slidably receive the window glass;

a locking rod flange, extending from the integrated channel and regulator, the locking rod flange including a locking rod carrier spaced from the glass run channel, the locking rod carrier including a rod pass through hole;

a vertical locking rod extending through the pass through hole and configured to operatively engage a door latch assembly; and a rod pass through seal mounted on the locking rod carrier such that the rod pass through seal covers the rod pass through hole, the rod pass through seal including a rod slit through which the vertical locking rod extends.

2. The integrated channel and regulator of claim 1 including a window regulator guide rail wherein the window regulator guide rail is integral with the glass run channel.

3. The integrated channel and regulator of claim 2 wherein the locking rod flange is integral with the glass run channel and the window regulator guide rail.

4. The integrated channel and regulator of claim 1 wherein the locking rod flange is integral with glass run channel.

5. The integrated channel and regulator of claim 1 wherein the locking rod carrier includes a bridge portion configured to sealably engage with a water deflector.

6. The integrated channel and regulator of claim 5 including a water deflector seal extending across the bridge portion.

7. A vehicle door, having a movable window glass, comprising:

a door inner panel including a lower door portion defining an access hole therethrough;

a glass run channel mounted to door inner panel and shaped to slidably receive the window glass;

a locking rod flange, extending from the glass run channel and including a locking rod carrier spaced from the glass run channel, the locking rod carrier including a rod pass through hole at least partially aligned with the access hole;

a vertical locking rod extending through the pass through hole and extending from the vehicle door, the vertical locking rod configured to operatively engage a door latch assembly; and a rod pass through seal mounted on the locking rod carrier such that the rod pass through seal covers the rod pass through hole, the rod pass through seal including a rod slit through which the vertical locking rod extends.

8. The door of claim 7 including the door latch assembly wherein the door latch assembly is mounted to the glass run channel and the vertical locking rod operatively engages the door latch assembly.

9. The door of claim 7 wherein the locking rod carrier includes a bridge portion, and a water deflector seal extends across the bridge portion and the door inner panel around the access hole, and the vehicle door includes a water deflector mounted to the water deflector seal.

10. The door of claim 7 wherein the locking rod flange is integral with glass run channel.

11. The door of claim 7 including a window regulator guide rail extending adjacent to the glass run channel.

12. The door of claim 11 wherein the window regulator guide rail is integral with the glass run channel and the locking rod flange.

* * * * *